United States Patent
Kirkup et al.

(10) Patent No.: US 8,626,139 B2
(45) Date of Patent: *Jan. 7, 2014

(54) SYSTEM AND METHOD OF CONNECTION CONTROL FOR WIRELESS MOBILE COMMUNICATION DEVICES

(75) Inventors: Michael G. Kirkup, Waterloo (CA); Herbert A. Little, Waterloo (CA); David P. Yach, Waterloo (CA)

(73) Assignee: BlackBerry Limited, Waterloo, ON (CA)

(*) Notice: Subject to any disclaimer, the term of this patent is extended or adjusted under 35 U.S.C. 154(b) by 973 days.

This patent is subject to a terminal disclaimer.

(21) Appl. No.: 12/016,632

(22) Filed: Jan. 18, 2008

(65) Prior Publication Data

US 2008/0132202 A1 Jun. 5, 2008

Related U.S. Application Data

(63) Continuation of application No. 11/483,445, filed on Jul. 10, 2006, now Pat. No. 7,330,712, which is a continuation of application No. 10/698,602, filed on Oct. 31, 2003, now Pat. No. 7,076,239.

(60) Provisional application No. 60/424,723, filed on Nov. 8, 2002.

(51) Int. Cl.
*H04M 3/00* (2006.01)

(52) U.S. Cl.
USPC ......... 455/418; 455/410; 455/411; 455/414.1

(58) Field of Classification Search
USPC .............. 455/410, 411, 414.1, 418
See application file for complete search history.

(56) References Cited

U.S. PATENT DOCUMENTS

| | | | |
|---|---|---|---|
| 4,815,128 A | 3/1989 | Malek | |
| 4,837,812 A | 6/1989 | Takahashi et al. | |
| 4,972,457 A | 11/1990 | O'Sullivan | |
| 4,991,197 A | 2/1991 | Morris | |
| 5,220,604 A | 6/1993 | Gasser et al. | |

(Continued)

FOREIGN PATENT DOCUMENTS

| | | |
|---|---|---|
| CA | 2505343 C | 6/2010 |
| EP | 1 168 141 A2 | 1/2002 |

(Continued)

OTHER PUBLICATIONS

Int'l Search Report and the Written Opinion of the Int'l Searching Authority, or the Declaration of Appln. Serial No. PCT/CA2004/000250 of Feb. 20, 2004—12 pgs.

(Continued)

*Primary Examiner* — Nghi H Ly
(74) *Attorney, Agent, or Firm* — Perry + Currier

(57) ABSTRACT

Systems and methods of connection control for wireless mobile communication devices enabled for communication via a plurality of communication connections are provided. Connection control information associates software applications with communication connections. When a connection request specifying a requested connection is received from a software application, it is determined whether the requested connection is permitted by the connection control information. Where the requested connection is permitted by the connection control information, the requested connection is opened. If the requested connection is a first connection opened by the software application, then the software application is associated with the requested connection in the connection control information.

21 Claims, 5 Drawing Sheets

(56) References Cited

U.S. PATENT DOCUMENTS

| | | |
|---|---|---|
| 5,408,520 A | 4/1995 | Clark et al. |
| 5,606,594 A | 2/1997 | Register et al. |
| 5,802,483 A | 9/1998 | Morris |
| 5,850,515 A | 12/1998 | Lo et al. |
| 5,987,611 A | 11/1999 | Freund |
| 6,131,136 A | 10/2000 | Liebenow et al. |
| 6,233,446 B1 | 5/2001 | Do |
| 6,243,756 B1 | 6/2001 | Whitmire et al. |
| 6,253,326 B1 | 6/2001 | Lincke et al. |
| 6,285,889 B1 | 9/2001 | Nykanen et al. |
| 6,343,313 B1 * | 1/2002 | Salesky et al. ............ 709/204 |
| 6,405,202 B1 | 6/2002 | Britton et al. |
| 6,490,289 B1 | 12/2002 | Zhang et al. |
| 6,745,047 B1 | 6/2004 | Karstens et al. |
| 6,748,543 B1 | 6/2004 | Vilhuber |
| 6,775,536 B1 | 8/2004 | Geiger et al. |
| 6,785,810 B1 | 8/2004 | Lirov et al. |
| 6,895,502 B1 | 5/2005 | Fraser |
| 6,901,429 B2 | 5/2005 | Dowling |
| 6,957,330 B1 | 10/2005 | Hughes |
| 7,042,988 B2 | 5/2006 | Juitt et al. |
| 7,076,239 B2 * | 7/2006 | Kirkup et al. ............ 455/411 |
| 7,076,797 B2 | 7/2006 | Loveland |
| 7,146,638 B2 | 12/2006 | Malcolm |
| 7,187,678 B2 | 3/2007 | Cunetto et al. |
| 7,246,374 B1 | 7/2007 | Simon et al. |
| 7,330,712 B2 * | 2/2008 | Kirkup et al. ............ 455/411 |
| 2002/0031230 A1 | 3/2002 | Kwon et al. |
| 2002/0095497 A1 | 7/2002 | Satagopan et al. |
| 2002/0184398 A1 | 12/2002 | Orenshteyn |
| 2003/0005317 A1 | 1/2003 | Audebert et al. |
| 2003/0014521 A1 | 1/2003 | Elson et al. |
| 2003/0031184 A1 | 2/2003 | Cunetto et al. |
| 2003/0054860 A1 | 3/2003 | Chen |
| 2003/0070091 A1 | 4/2003 | Loveland |
| 2003/0087629 A1 | 5/2003 | Juitt et al. |
| 2003/0163685 A1 | 8/2003 | Paatero |
| 2003/0167405 A1 | 9/2003 | Freund et al. |
| 2003/0177389 A1 | 9/2003 | Albert et al. |
| 2004/0097217 A1 | 5/2004 | McClain |
| 2004/0121802 A1 | 6/2004 | Kim et al. |
| 2005/0213763 A1 | 9/2005 | Owen et al. |

FOREIGN PATENT DOCUMENTS

| | | |
|---|---|---|
| EP | 1 471 691 A2 | 10/2004 |
| EP | 1563663 B1 | 10/2008 |
| EP | 1471691 A3 | 2/2010 |
| GB | 2 378 780 A | 2/2003 |
| WO | WO 00/60434 | 10/2000 |
| WO | WO 2004/043031 A1 | 5/2004 |

OTHER PUBLICATIONS

Int'l Search Report or the Declaration of Appln. Serial No. PCT/CA03/01679 of Oct. 31, 2003—6 pgs.

Red Hat: "Red Hat Linux 7.2—The Official Red Had Linux Reference Guide" Red Hat Linux Manuals, Online!, Oct. 22, 2001, XP002276029, pp. 145-155.

Sygate: "Sygate Personal Firewall PRO User Guide" Sygate Personal Firewall Pro User Guide version 2.0 2001, pp. 1-77, XP002248366.

"A Technical Overview of the Lucent VPN Firewall" White Paper Lucent Technologies, XX, XX, Aug. 2002, pp. 1-35, XP002271173, Chapter 1.

European Search Report of Appln. No. 04256690.1-2412, date of mailing Apr. 6, 2005—9 pgs.

Fourth Office Action. Chinese Application No. 200380105435.2. Dated: Aug. 3, 2011.

Patent Certificate. Indian Patent Application No. 1956/DELNP/2005. Dated: Oct. 31, 2003.

Certificate of Grant of Patent. Singapore Patent No. 112419. Dated: Apr. 30, 2007.

Certificate of Grant of Patent. Hong Kong Patent No. 1080315. Dated: Apr. 24, 2009.

Notice of Allowance. Canadian Application No. 2,505,343. Dated: Sep. 15, 2009.

* cited by examiner

SYSTEM AND METHOD OF CONNECTION CONTROL FOR WIRELESS MOBILE COMMUNICATION DEVICES

CROSS-REFERENCE TO RELATED APPLICATION

This application is a continuation of U.S. patent application Ser. No. 11/483,445, filed Jul. 10, 2006 now U.S. Pat. No. 7,330,712, which is a continuation of U.S. patent application Ser. No. 10/698,602 filed Oct. 31, 2003, which has issued as U.S. Pat. No. 7,076,239, issued Jul. 11, 2006. This application also claims the benefit, pursuant to 35 U.S.C. §119(e), of provisional U.S. patent application No. 60/424,723, filed Nov. 8, 2002, entitled "SYSTEM AND METHOD OF CONNECTION CONTROL FOR WIRELESS MOBILE COMMUNICATION DEVICES." By this reference, each of the above applications is hereby incorporated herein for all purposes.

BACKGROUND

This application relates generally to wireless mobile communication devices, and in particular to providing control of communication connections for such devices.

Many known wireless mobile communication devices ("mobile devices") support different types of communication network connections and data exchange with different information sources or destination systems. For example, modern mobile telephones are often enabled for both data and voice communications and typically exchange both public and private information with remote communication equipment, including web servers on the Internet and data servers associated with a user's employer, for example.

Private information such as data obtained from a corporate data server in a private network is normally protected during transfer to a mobile device via secure connections, encryption, digital signatures, or some combination thereof, thereby effectively extending information security measures implemented at the corporate data server to the mobile device. However, an owner or source of the private information may wish to prevent transfer of the information outside the mobile device. On known mobile devices which also support communication with other entities external to the corporate data server and private network, it is possible for a software application to open a connection or communication "pipe" with both the corporate data server and an external entity and then funnel private information from the corporate data server to the external entity. Such a "split-pipe" attack could potentially be mounted by a software application downloaded by a mobile device user or a virus, for example.

Therefore, there remains a need for a system and method of connection control for mobile devices.

SUMMARY

In accordance with the teachings disclosed herein, a system of connection control for a wireless mobile communication device is provided for communication via a plurality of communication connections and operable to execute a software application comprises a memory configured to store connection control information associating the software application with a communication connection, and a connection controller. The connection controller is configured to receive a connection request from the software application specifying a requested connection and to access the memory to determine whether the requested connection is permitted by the connection control information. Where the requested connection is permitted by the connection control information, the requested connection is opened.

Other aspects may be included, such as the connection controller being configured to determine whether the requested connection is a first connection opened by the software application, and if so, to associate the software application with the requested connection in the connection control information in the memory.

A method of connection control according comprises the steps of providing connection control information associating a software application with a communication connection, receiving a connection request from the software application specifying a requested connection, determining whether the requested connection is permitted by the connection control information, opening the requested connection where the requested connection is permitted by the connection control information.

Other aspects may be includes such as determining whether the requested connection is a first connection opened by the software application, and if so, updating the connection control information to associate the software application with the requested connection.

These methods are not limited to the order of steps or segregation of steps described above; rather, the aggregation of steps, or portions thereof, into a single step, or multiple other steps, or the reordering of such original steps or aggregations are specifically contemplated. In addition, one or more of the described steps may be stored as computer executable instructions in and/or on any suitable combination of computer-readable media. Instead of, or in addition to stored instructions, one or more steps, or portions thereof, may be executed by special purpose hardware designed to perform such steps.

Further features of connection control systems and methods will be described or will become apparent in the course of the following detailed description.

DETAILED DESCRIPTION

Figure 1:
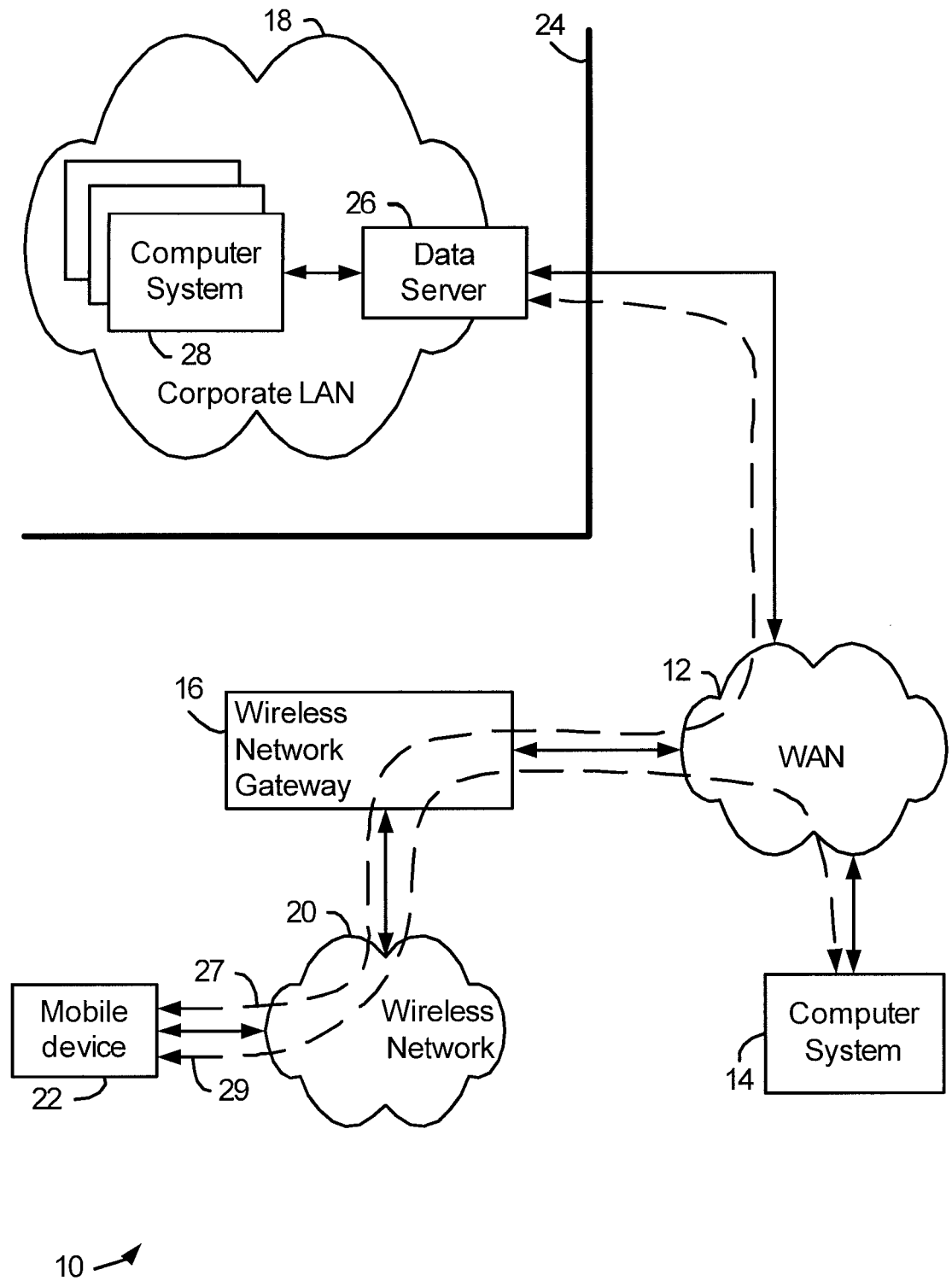
FIG. 1 is a block diagram showing a communication system in which wireless mobile communication devices may be used.

FIG. 1 is a block diagram showing a communication system in which wireless mobile communication devices may be used. The communication system 10 includes a Wide Area Network (WAN) 12, coupled to a computer system 14, a wireless network gateway 16 and a corporate Local Area Network (LAN) 18. The wireless network gateway 16 is also connected to a wireless communication network 20 in which a mobile device 22 configured to operate.

The computer system 14 may be a desktop or laptop PC, which is configured to communicate to the WAN 12, the Internet for example. PCs, such as computer system 14, normally access the Internet through an Internet Service Provider (ISP), Application Service Provider (ASP) or the like.

The corporate LAN 18 is an example of a typical working environment, in which multiple computers 28 are connected in a network. Such a network is often located behind a security firewall 24. Within the corporate LAN 18, a data server 26, operating on a computer behind the firewall 24, acts as the primary interface for the corporation to exchange data both within the LAN 18, and with other external systems and devices via the WAN 12. The data server 26 may, for example, be a messaging server such as a Microsoft™ Exchange Server or a Lotus Domino™ server. These servers also provide additional functionality, such as dynamic database storage for data like calendars, todo lists, task lists, e-mail and documentation. Although only a data server 26 is shown in the LAN 18, those skilled in the art will appreciate that a LAN may include more than one server, including other types of servers supporting resources that are shared between the networked computer systems 28.

The data server 26 provides data communication capabilities to networked computer systems 28 coupled to the LAN 18. A typical LAN 18 includes multiple computer systems 28, each of which implements an appropriate client for communications with the data server 26. In the above example of electronic messaging, within the LAN 18, messages are received by the data server 26, distributed to the appropriate mailboxes for user accounts addressed in the received message, and are then accessed by a user through a messaging client operating on a computer system 28. Exchange of other types of data than electronic messages is similarly enabled using clients compatible with the data server 26. Multiple-purpose clients such as Lotus Notes, for example, handle electronic messages as well as other types of files and data.

The wireless gateway 16 provides an interface to a wireless network 20, through which data may be exchanged with a mobile device 22. The mobile device 22 may, for example, be a data communication device, a dual-mode communication device such as many modern cellular telephones having both data and voice communications functionality, a multiple-mode device capable of voice, data and other types of communications, a personal digital assistant (PDA) enabled for wireless communications, or a laptop or desktop computer system with a wireless modem. An exemplary mobile device is described in further detail below.

Such functions as addressing of the mobile device 22, encoding or otherwise transforming messages for wireless transmission, or other necessary interface functions are performed by the wireless network gateway 16. The wireless network gateway 16 may be configured to operate with more than one wireless network 20, in which case the wireless gateway 16 also determines a most likely network for locating a given mobile device 22 and possibly tracks mobile devices as users roam between countries or networks. Although only a single wireless network gateway 16 is shown in FIG. 1, the mobile device 22 could be configured to communicate with more than one gateway, such as a corporate network gateway and a WAP gateway, for example.

Any computer system with access to the WAN 12 may potentially exchange data with the mobile device 22 through the wireless network gateway 16, provided the mobile device is enabled for such communications. Alternatively, private wireless network gateways such as wireless Virtual Private Network (VPN) routers could also be implemented to provide a private interface to a wireless network. For example, a wireless VPN implemented in the LAN 18 may provide a private interface from the LAN 18 to one or more mobile devices such as 22 through the wireless network 20 without requiring the wireless network gateway 16. Such a private interface to a mobile device 22 via the wireless network gateway 16 and/or the wireless network 20 may also effectively be extended to entities outside the LAN 18 by providing a data forwarding or redirection system that operates in conjunction with the data server 26.

A wireless network 20 normally delivers data to and from communication devices such as the mobile device 22 via radio frequency (RF) transmissions between base stations and devices. The wireless network 20 may, for example, be a data-centric wireless network, a voice-centric wireless network, or a dual-mode network that can support both voice and data communications over the same infrastructure. Recently developed networks include Code Division Multiple Access (CDMA) networks, Groupe Special Mobile or the Global System for Mobile Communications (GSM) and General Packet Radio Service (GPRS) networks, and third-generation (3G) networks like Enhanced Data rates for Global Evolution (EDGE) and Universal Mobile Telecommunications Systems (UMTS), which are currently under development. GPRS is a data overlay on top of the existing GSM wireless network, which is used operating in virtually every country in Europe. Some older examples of data-centric networks include, but are not limited to, the Mobitex™ Radio Network ("Mobitex"), and the DataTAC™ Radio Network ("DataTAC"). Examples of known voice-centric data networks include Personal Communication Systems (PCS) networks like GSM and Time Division Multiple Access (TDMA) systems that have been available in North America and world-wide for several years.

In the system 10, a company which owns the corporate LAN 18 may provide both a computer system 28 and a mobile device 22 to an employee. Corporate data on the LAN 18 is then accessible to the user through at least the computer system 28. Many corporate mobile device owners also provide access to corporate data via mobile devices such as 22. Even though mobile devices provided to employee users by employer owners may be intended primarily for business purposes, other accepted or allowed mobile device functions and services, both business-related and personal, often involve communication network connections to systems outside a corporate network 18 or security firewall 24. As described above, secure connections, data encryption, and other secure communications techniques effectively extend the security firewall 24 to the mobile device 22 when corporate data is being accessed using the mobile device 22. However, software applications on the mobile device 22 can potentially open connections on both sides of the firewall 24, including a connection 27 back into the corporate LAN 18, and a connection 29 to an external entity, the computer system 14, outside the firewall 24. In this manner, corporate data accessible through the data server 26 can be funneled from the corporate network 18 to the external computer system 14. In this instance, the computer system 14 obtains corporate data but is not linked with the data access operation via an audit trail. The only audit trail associated with such a data access operation would indicate that the corporate data was accessed by the authorized mobile device 22, not by the computer system 14.

A corporate owner of the mobile device 22 could address this problem by installing any allowable software applications on the mobile device 22 before the mobile device 22 is provided to an employee user, and configuring the mobile device 22 to prevent installation of any further software applications. Although this scheme protects against split-pipe attacks on corporate data, it also requires the corporate owner to perform mobile device software updates and installation of new software applications, for example, for all mobile devices owned by the corporate owner, which could include hundreds or thousands of mobile devices in a large company. Therefore, such a security measure may be effective, but creates further problem of mobile device software management.

Systems and methods as proposed herein also prevent split-pipe attacks, while allowing users to manage mobile device software.

Figure 2:
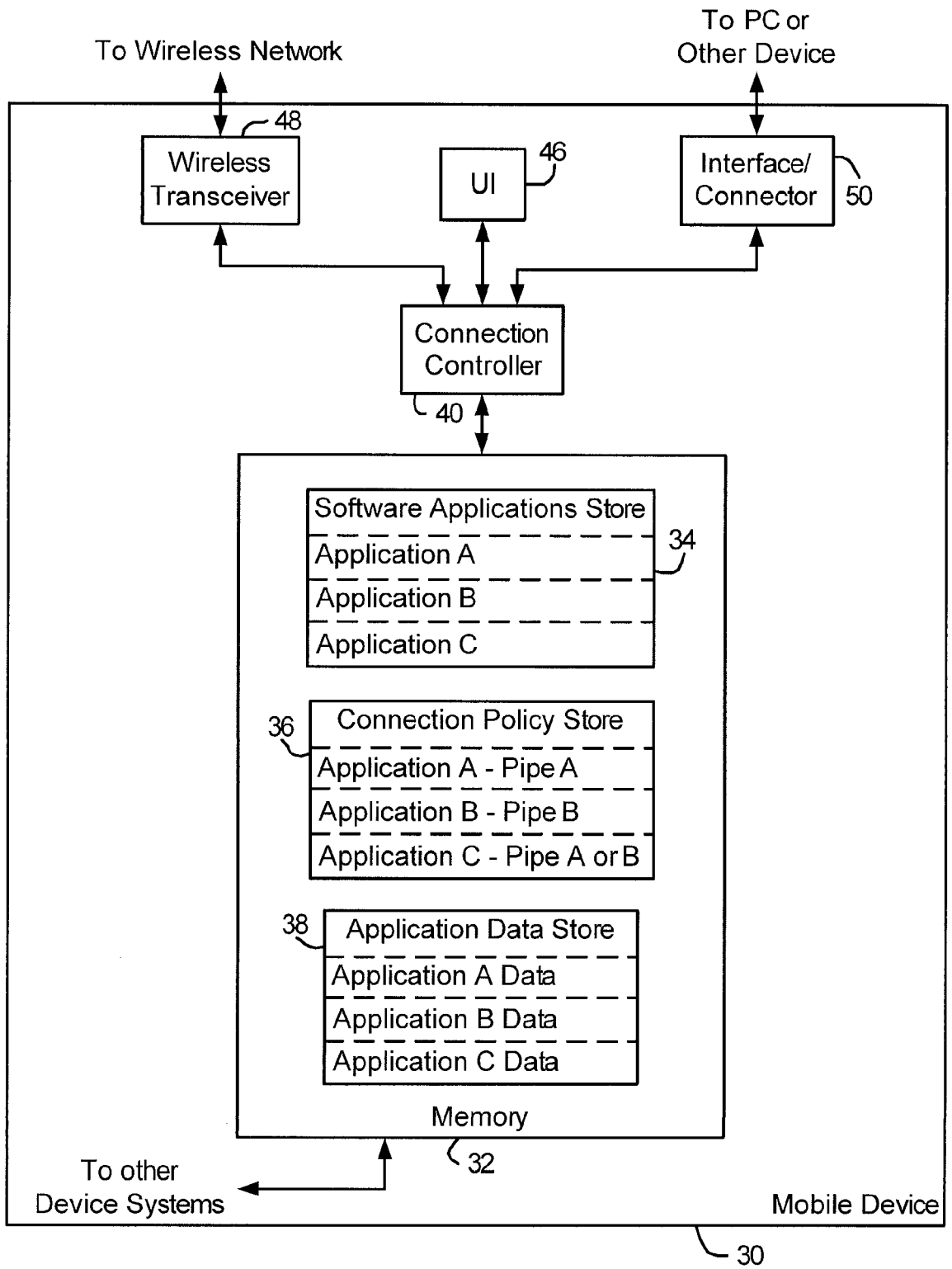
FIG. 2 is a block diagram of a wireless mobile communication device in which a system and method of connection control is implemented.

FIG. 2 is a block diagram of a wireless mobile communication device in which a system and method of connection control is implemented. It should be apparent to those skilled in the art that only the components involved in a connection control system are shown in FIG. 2. A mobile device typically includes further components, depending upon the type and functionality of the mobile device, than those shown in FIG. 2.

The mobile device 30 comprises a memory 32, a connection controller 40, a wireless transceiver 48, a user interface (UI) 46, and an interface or connector 50. The memory 32 includes a software applications store 34, a connection policy store 36, and an application data store 38. The connection policy store 36 is configured or adapted to enable connection control for the mobile device 30. The software application store 34 and the application data store 38 are illustrative of other types of information stores that may be provided in the memory 32. Further information stores, such as a contacts list, a message store, a file system, and a key store, for example, may also be provided in the memory 32.

The memory 32 is, or at least includes, a writeable store such as a RAM into which other device components may write data. The software applications store 34 includes software applications that have been installed on the mobile device 30, and may include, for example, an electronic messaging software application, a personal information management (PIM) software application, games, as well as other software applications. In the connection policy store 36, connection control information, which specifies which types of connections or communication "pipes" that each software application is permitted to establish, is stored. Data associated with the software applications installed on the mobile device 30 is stored in the application data store 38, and may include, for example, data files used by a software application or configuration information for a software application.

The wireless transceiver 48 enables the mobile device 30 for communications via a wireless network. The mobile device 30 is also enabled for communications with a similarly-equipped PC or other device, including another mobile device, via the interface/connector 50. In FIG. 2, connection controller 40 is coupled to the memory 32, the wireless transceiver 48, the UI 46, and the interface/connector 50. As will be described in further detail below, access to the wireless transceiver, and possibly the interface/connector 50, is controlled by the connection controller 40. The connection controller 40 can be implemented as a software module or operating system that is executed by a mobile device processor (not shown). For example, where the mobile device 30 is a Java™-enabled device including a Java Virtual Machine (JVM) as its operating system, functionality of the connection controller 40 may be incorporated within the JVM or implemented as a software component that is executed by the JVM. Connection control at the operating system level provides more streamlined and reliable connection control than control implemented at a software application level.

The UI 46 may include such UI components as a keyboard or keypad, a display, or other components which may accept inputs from or provide outputs to a user of the mobile device 30. Although shown as a single block in FIG. 2, it should be apparent that a mobile device 30 typically includes more than one UI, and the UI 46 is therefore intended to represent one or more user interfaces.

The interface/connector 50 enables information transfer between the mobile device 30 and a PC or another device via a communication link established between the interface/connector 50 and a compatible interface or connector in the PC or other device. The interface/connector 50 could be any of a plurality of data transfer components, including, for example, an optical data transfer interface such as an Infrared Data Association (IrDA) port, some other short-range wireless communications interface, or a wired interface such as serial, parallel, PCMCIA, PCI or Universal Serial Bus (USB) port and connection. Known short-range wireless communications interfaces include, for example, "Bluetooth" modules and 802.11 modules according to the Bluetooth and 802.11 specifications, respectively. It will be apparent to those skilled in the art that Bluetooth and 802.11 denote sets of specifications, available from the Institute of Electrical and Electronics Engineers (IEEE), relating to wireless LANs and wireless personal area networks, respectively.

Since communications between the mobile device 30 and other systems or devices via the interface/connector 50 need not necessarily be via a physical connection, references to connecting a mobile device to a PC or other device or system includes establishing communications through either physical connections or wireless transfer schemes. Thus, the mobile device 30 could be connected to a PC, for example, by placing the mobile device 30 in a mobile device cradle connected to a serial port on the PC, by positioning the mobile device 30 such that an optical port thereof is in a line of sight of a similar port of the PC, or by physically connecting or arranging the mobile device 30 and PC in some other manner so that data may be exchanged. The particular operations involved in establishing communications between a mobile device and another system or device will be dependent upon the types of interfaces and/or connectors available in both the mobile device and the other system or device.

As described above, split-pipe attacks are possible when both internal and external connections, that is, connections terminated within and outside a private network or security firewall, can be opened by a mobile device software application. In the mobile device 30, connections can be made via the wireless transceiver 48 or the interface/connector 50. Depending upon the type of mobile device 30 and the possible uses of the interface/connector 50, split-pipe attacks may be possible using different pipes associated with the wireless transceiver 48. Where private information may be transferred to the mobile device 30 via the interface/connector 50 when the mobile device 30 is connected to a similarly enabled system or device, for example, the private information could be funneled to an external entity by a software application which opens connections via the interface/connection 50 and the wireless transceiver 48. In this case, the connection controller 40 preferably controls access to both the wireless transceiver 48 and the interface/connector 50. However, it is noted that a mobile device implementing a connection control system or method in this manner need not necessarily incorporate such an interface/connector 50. Connection control could be implemented for connections using the same communication medium, such as multiple pipes established through the wireless transceiver 48, or connections using different communication media, where such different media are available.

A communication pipe is a connection, or means of communication, between a mobile device and some external entity. A particular physical transport layer, such as Universal Serial Bus (USB), Bluetooth, a serial port, a parallel port, 802.11 and GPRS, can represent several logical communication pipes, depending on the gateway at the other end. For example, the wireless transceiver 48 might be used to communicate with both a WAP gateway and a corporate gateway through a wireless communication network. In this case, connections with the WAP gateway and the corporate gateway may be established through the same physical transport in the wireless network, but represent separate communication pipes.

A software application may be associated with a connection or communication pipe the first time a connection is opened by the software application. An entry in the connection policy store 36 is either created or updated by the connection controller 40 for a software application when a connection is first opened by the software application. Once a software application is associated with a connection in the connection policy store 36, the software application cannot establish any other type of connection. The connection policy store 36 is preferably in a protected memory location not accessible to software applications on the mobile device 30. This ensures that a software application cannot open an internal connection to a source of private information, retrieve private information from the source, and then erase or change the connection policy store 36 in order to circumvent connection control.

Connection control information for a software application may be created in the connection policy store 36 either before or after the software application first establishes a connection. A connection control information entry containing default or null control information, indicating no connection type restriction or that any available type of connection can be opened, may be created for a software application when the software application is installed on the mobile device 30. The latter type of entry is shown in the connection policy store 36 for application C. When the software application C attempts to open a connection via pipe B, for example, the connection controller 40 consults the connection policy store 36, determines that the software application C may open a connection via either pipe A or pipe B, and the connection is opened. The connection controller then updates the connection policy store 36 to indicate that the software application C is restricted to pipe B, and the updated entry would appear similar to the entry shown for application B.

Alternatively, a connection control information entry for a software application could be created after the software application opens a connection for the first time. In this example, when a software application attempts to open a connection, the connection controller 40 consults the connection policy store 36 and determines that no connection control information entry exists for the software application. The connection is then opened for the software application, and the connection controller 40 creates a connection control information entry in the connection policy store 36 for the software application, indicating that the software application is permitted to open only the type of connection that was first opened by that application.

When a software application subsequently attempts to open a connection, the connection controller 40 accesses the connection policy store 36 and determines the type of connection that the software application is permitted to open. If the attempted connection is not of the permitted type, then the connection is denied.

As will be apparent from the foregoing, software applications cannot directly initiate connections. Each request by a software application to open a connection is processed by the connection controller 40 to determine whether the connection is allowed for that software application. Where the connection is allowed, the connection controller either opens the connection or directs other components of the mobile device 30, such as the wireless transceiver 48, to open the connection. Alternatively, software applications can only directly initiate connections after receiving suitable approval from connection controller 40; software applications upon receipt of approval can then make direct requests for connections that include an indicator of the prior approval.

Figure 3:
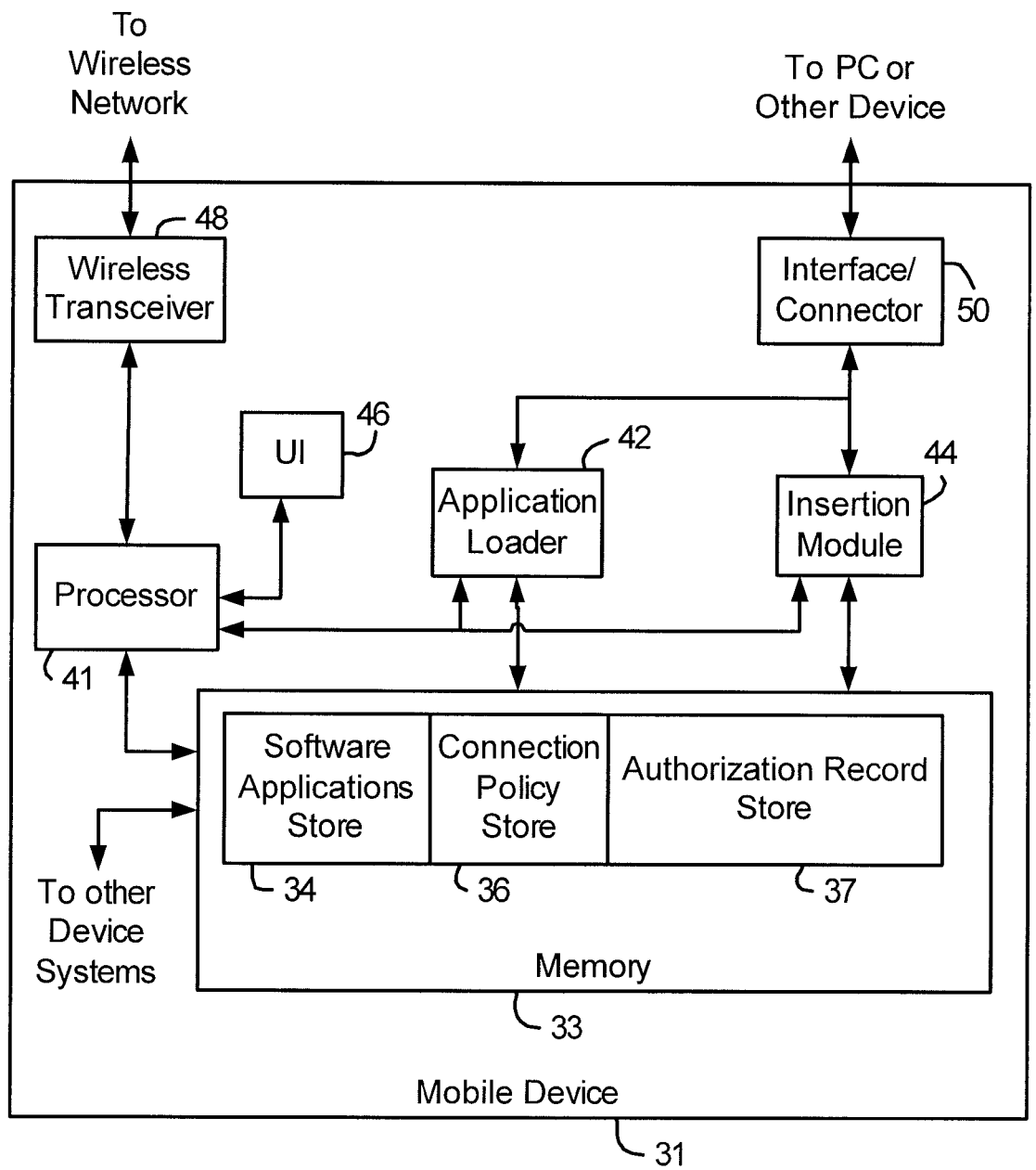
FIG. 3 is a block diagram illustrating a further embodiment of a connection control system on a wireless mobile communication device.

FIG. 3 is a block diagram illustrating a further embodiment of a connection control system on a wireless mobile communication device. The mobile device 31 in FIG. 3 includes a memory 33, a processor 41, an application loader 42, an insertion module 44, a user interface (UI) 46, a wireless transceiver 48, and an interface/connector 50. The memory 33 includes a software applications store 34, a connection policy store 36, and an authorization record store 37, and may also include further data stores associated with other device systems in addition to those shown in FIG. 3.

The mobile device 31 is substantially the same as the mobile device 30 shown in FIG. 2. The software applications store 34, connection policy store 36, the UI 46, the wireless transceiver 48, and the interface/connector 50 have been described above. The memory 33 is also similar to the memory 32, but includes the authorization record store 37 which stores records that specify usage permissions and restrictions for the mobile device 31, software applications on the mobile device 31, or both. Connection control for the mobile device 31 is provided by the processor 41, in conjunction with both the connection policy store 36, substantially as described above, and the authorization record store, as described in further detail below.

The processor 41 is connected to the wireless transceiver 48 and thus enables the mobile device 31 for communications via a wireless network. The application loader 42 and insertion module 44 are connected to the interface/connector 50 to allow communication with a similarly enabled PC or other device to load applications and authorization records onto the mobile device 31. It should be appreciated that software applications and authorization records could also be loaded through the wireless transceiver 48 and a wireless communication network. However, connections from the wireless transceiver 48 to the application loader 42 and the insertion tool 44 have not been shown in FIG. 3 to avoid congestion in the drawing.

Authorization records provide a further level of connection control for an owner of the mobile device 31, such as an employer of a mobile device user. When the connection policy store 36 is provided on a mobile device, as shown in FIG. 3, authorization records in the authorization record store 37 may specify, for example, the types of connections that may be opened by the mobile device 31, which pipes are restricted for use by only those applications installed or provided by the owner, or which pipes can be used by other software applications. Although authorization records established by an owner may control other functions of the mobile device 31 than data communication connections, records relating to connection control are most pertinent to the systems and methods described herein.

An owner of the mobile device 31 preferably inserts authorization records onto the mobile device 31 using the insertion module 44 before communication functions of the mobile device 31 are operable by a user. This may be accomplished, for example, by pre-loading authorization records into the authorization record store 37 from a configuration device such as a PC before the mobile device 31 is provided to the user by the owner, or before the mobile device 31 is configured for use. In the former example, the owner maintains physical control of the mobile device 31 until authorization records have been loaded, whereas in the latter example, the user has possession of the mobile device 31 but is unable to make use of the device until it is configured by, or at least under the control of, the owner.

Pre-loading of authorization records onto the mobile device 31 is performed using the insertion module 44, the interface/connector 50, and a similarly enabled configuration device. When the mobile device 31 has been connected to the configuration device, authorization records are transferred to the mobile device 31 through the interface/connector 50, and passed to the insertion module 44 on the mobile device 31, which stores the authorization records to the authorization record store 37 in the memory 33.

Although the insertion module 44 is shown in FIG. 3 as being connected to the interface/connector 50, this module could be implemented as a software module or application that is executed by the processor 41. As such, data transfers to and from the interface/connector 50 may actually be accomplished by routing data through the processor 41. In this case, the processor 41 may be instructed by the configuration device to start the insertion module 44 before the authorization records are transferred to the mobile device 31. Alternatively, the processor 41 may be configured to start the insertion module 44 whenever authorization records are received or connection of the mobile device 31 to a configuration device is detected.

As shown in FIG. 3, other systems on the mobile device 30 have access to the memory 33. However, no device system other than the insertion module 44 should be able to insert, change, or erase information stored in the authorization record store 37. The authorization data store 37, like the connection policy store 36 as described above, is therefore preferably located in a protected memory area that is not accessible to other device systems or software applications. Only the insertion module 44 has write and erase access to the authorization record store 37. Other device systems have read only access to authorization records.

Access control to the authorization record store 37 could be enforced, for example, using digital signature techniques. Pre-loading a public signature key, corresponding to a private signature key of the mobile device owner, onto the mobile device 31 enables digital signature-based control of insertion and erasure of authorization records. When the owner's public signature key has been inserted into the mobile device 31, through the interface/connector 50 or the wireless transceiver 48, and stored in a key store (not shown) on the mobile device 31, the insertion module 44 can verify a digital signature on any subsequently inserted authorization records or memory write or erase commands before the authorization records are stored in the authorization record store 37 or the commands are executed. If digital signature verification fails, then the authorization records are not stored on the mobile device 31, and the commands are not executed. Digital signature-based access control also allows distribution of authorization records over insecure connections. A connection through the interface/connector 50, such as through a serial connection to a user's office PC, can normally be trusted since the source of information is trusted and the connection is secure; however, such connection can be secured as discussed herein. Using digital signatures and verification, a mobile device 31 can verify the integrity and origin of authorization records received via other connections, including wireless communication pipes.

In one embodiment, any systems or components through which the memory 33 is accessible are configured to allow memory read operations from any locations in the memory 33, but deny any write or erase operations to the authorization record store 37 unless the operations originate with or are authorized by the insertion module 44. In an alternative implementation, a memory manager (not shown) is provided to manage all memory access operations. Such a memory manager is configured to direct any write or erase operations involving the authorization record store to the insertion module 44 for digital signature verification before completing the operations.

Software application loading operations are enabled on the mobile device 31 by the application loader 42. As described above in regard to the insertion module 44, although the application loader 42 is shown as being connected to the interface/connector 50, information may actually be exchanged between the application loader 42 and the interface/connector 50, or the wireless transceiver 48, through the processor 41.

Software applications may be received by the mobile device 31 via the interface/connector 50 or the wireless transceiver 48. One possible source of software applications configured for operation on the mobile device 31 is a user's computer system equipped with an interface/connector compatible with the interface/connector 50. When the computer system is connected to a corporate LAN, for example, software applications provided by a corporate owner of the mobile device 31 may be retrieved from a file server on the LAN or other store on the LAN, and transferred to the mobile device 31. A computer system or mobile device 31 may also obtain software applications from other sources, such as Internet-based sources, with which the computer system or mobile device 31 communicates.

The application loader 42 is configured to install software applications on the mobile device 31, but may also perform such operations as checking a digital signature on a received software application or determining whether a received software application is approved for installation on the mobile device 31 before a software application is installed. Software application installation typically involves such operations as storing a received application file to the software applications store 34 in the memory 32, extracting files for storage to the software applications store 34, or possibly executing an installation program or utility.

In the embodiment shown in FIG. 3, as above, a software application is associated with a connection or communication pipe the first time a connection is opened by the software application by creating or updating an entry in the connection policy store 36. The connection controller 40 of FIG. 2 is embodied in the processor 41 in the mobile device 31. The processor 41 executes connection control software, at an application level or an operating system level, to prevent split-pipe attacks substantially as described above. When a request from a software application to open a connection is received by the processor 41, the connection policy store 36 is accessed to determine if the requested connection is allowed for that software application. Where the requested connection is not allowed, the connection is denied.

As a further connection control measure, when connection control information in the connection policy store 26 allows the requested connection, the processor 41 also accesses the authorization record store 37 to determine whether the connection is permitted. Authorization records may specify further connection restrictions, to allow or deny particular connections or types of connections, for example, for all software applications or for certain software applications. In this embodiment, even though a software application may be associated with one or more connections in the connection policy store 36, the processor 41 denies the requested connection where an authorization record specifies that the requested connection is not authorized. This situation may arise, for instance, where authorization records are inserted onto the mobile device 31 after a software application has first opened a connection.

Where a requested connection is allowed by both the connection control information in the connection policy store 36 for the software application and authorization records in the authorization record store 37 for the connection and/or the software application, the connection is opened by the processor 41. Otherwise, the connection is denied.

It will be appreciated by those skilled in the art that the connection policy store 36 and the authorization record store 37 could alternatively be accessed in reverse order.

Figure 4:
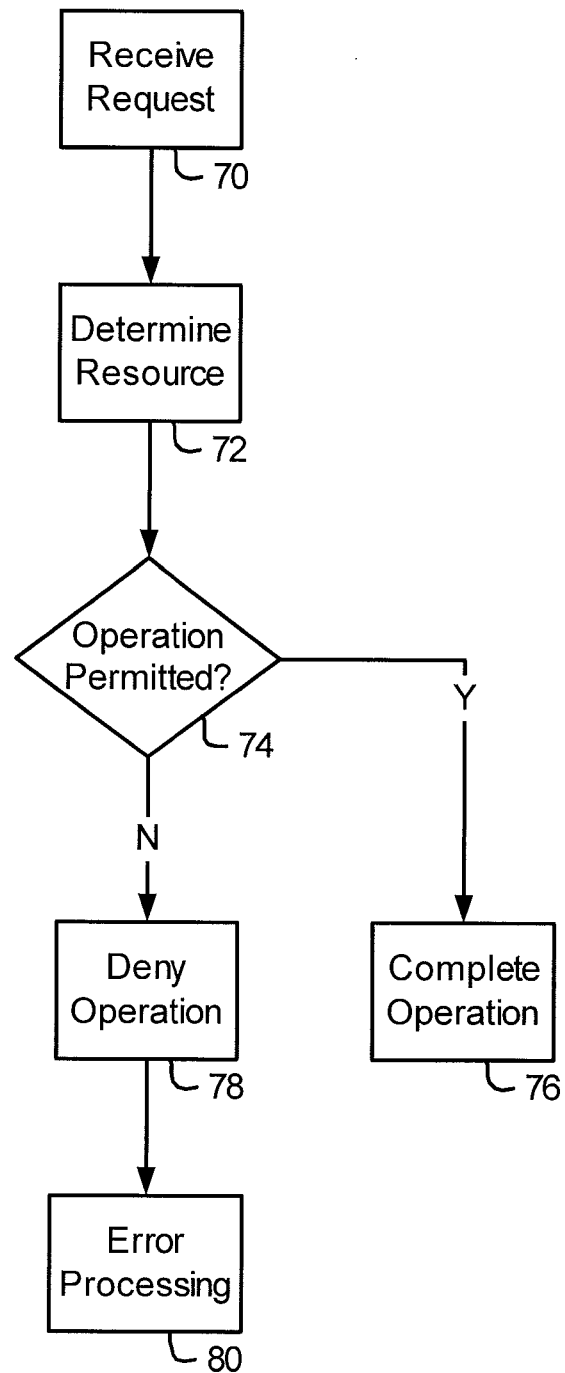
FIG. 4 is a flow diagram showing a method for connection control for a wireless mobile communication device.

FIG. 4 is a flow diagram showing a method for connection control for a wireless mobile communication device. The method begins at step 70, where a request to perform an operation, in this case to open a connection, is received from a software application. At step 72, the connection controller 40 (FIG. 2) or the processor 41 (FIG. 3) determines the communication resource to which the request relates. For a connection control scheme, the communication resource is a connection or pipe.

It is then determined at step 74 whether the requested connection operation is permitted. This determination involves accessing a connection policy store, and possibly an authorization record store, to determine whether the requested connection is allowed for the software application from which the request was received. The operation is completed by opening or authorizing the requested connection at step 76 where the requested connection is permitted. If the requested connection is the first connection opened by the software application, then step 76 involves the further operation of creating or updating connection control information in the connection policy store.

The requested connection is denied at step 78 where it is not permitted. A requested connection could be denied based on connection control information or authorization records. Error processing, such as requesting a different connection, may then be performed by the requesting software application at step 80.

Figure 5:
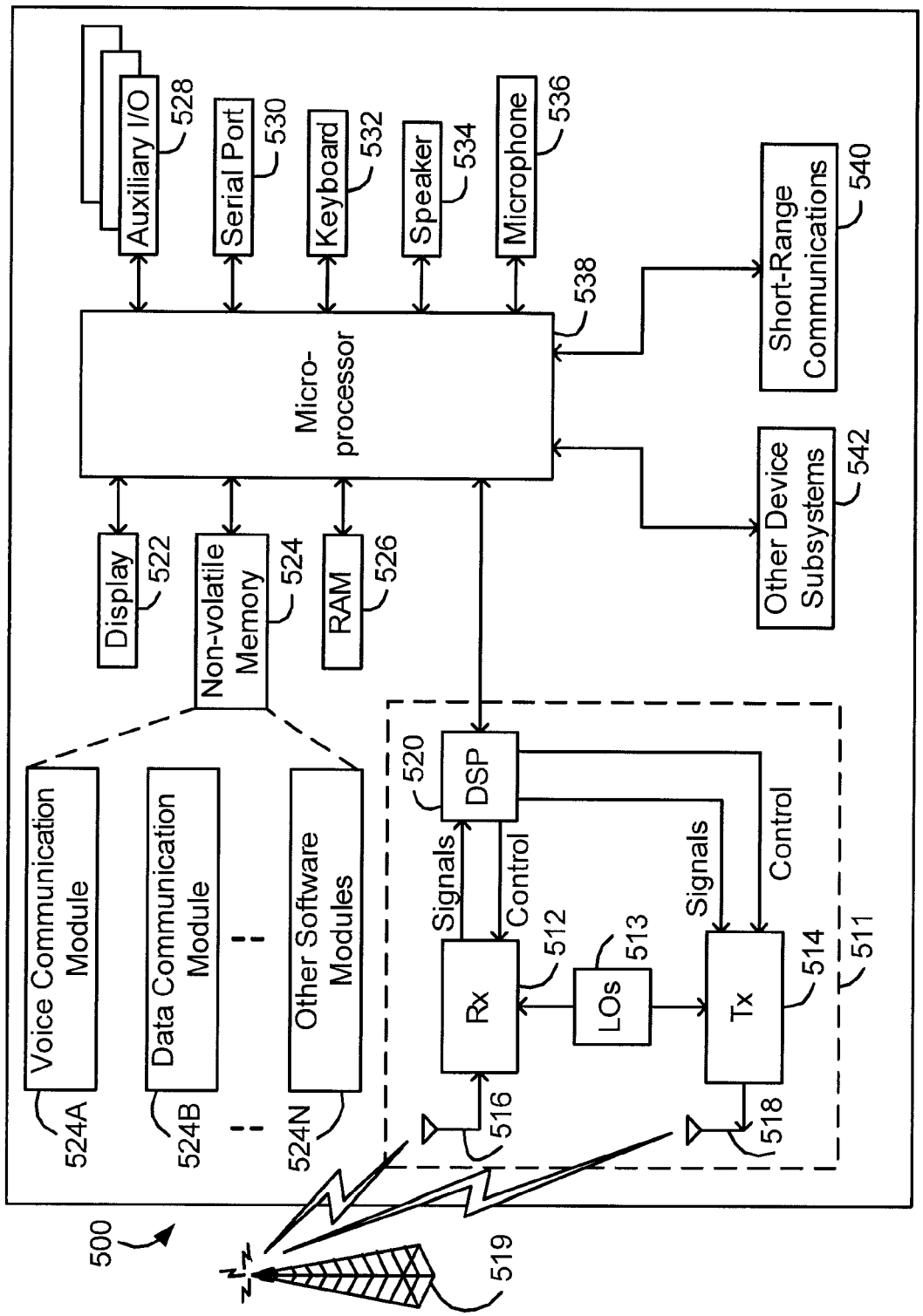
FIG. 5 is a block diagram of an example wireless mobile communication device.

FIG. 5 is a block diagram of an example wireless mobile communication device. The mobile device in FIG. 5 is representative of a type of mobile device in which connection control systems and methods described herein could be implemented.

The mobile device 500 is preferably a two-way communication device enabled for at least voice and data communications, with the further capability to communicate with other computer systems on the Internet. Depending on the functionality provided by the mobile device, the mobile device may be referred to as a data messaging device, a two-way pager, a cellular telephone with data messaging capabilities, a wireless Internet appliance, or a data communication device (with or without telephony capabilities). As mentioned above, such devices are referred to generally herein simply as mobile devices.

The mobile device 500 includes a transceiver 511, a microprocessor 538, a display 522, non-volatile memory 524, random access memory (RAM) 526, auxiliary input/output (I/O) devices 528, a serial port 530, a keyboard 532, a speaker 534, a microphone 536, a short-range wireless communications sub-system 540, and may also include other device sub-systems 542. The transceiver 511 preferably includes transmit and receive antennas 516, 518, a receiver (Rx) 512, a transmitter (Tx) 514, one or more local oscillators (LOs) 513, and a digital signal processor (DSP) 520. Within the non-volatile memory 524, the mobile device 500 includes a plurality of software modules 524A-524N that can be executed by the microprocessor 538 (and/or the DSP 520), including a voice communication module 524A, a data communication module 524B, and a plurality of other operational modules 524N for carrying out a plurality of other functions.

The mobile device 500 is preferably a two-way communication device having voice and data communication capabilities. Thus, for example, the mobile device 500 may communicate over a voice network, such as any of the analog or digital cellular networks, and may also communicate over a data network. The voice and data networks are depicted in FIG. 5 by the communication tower 519. These voice and data networks may be separate communication networks using separate infrastructure, such as base stations, network controllers, etc., or they may be integrated into a single wireless network. References to the network 519 should therefore be interpreted as encompassing both a single voice and data network and separate networks.

The communication subsystem 511 is used to communicate with the network 519. The DSP 520 is used to send and receive communication signals to and from the transmitter 514 and receiver 512, and also exchange control information with the transmitter 514 and receiver 512. If the voice and data communications occur at a single frequency, or closely-spaced set of frequencies, then a single LO 513 may be used in conjunction with the transmitter 514 and receiver 512. Alternatively, if different frequencies are utilized for voice communications versus data communications or the mobile device 500 is enabled for communications on more than one network 519, then a plurality of LOs 513 can be used to generate frequencies corresponding to those used in the network 519. Although two antennas 516, 518 are depicted in FIG. 5, the mobile device 500 could be used with a single antenna structure. Information, which includes both voice and data information, is communicated to and from the communication module 511 via a link between the DSP 520 and the microprocessor 538.

The detailed design of the communication subsystem 511, such as frequency band, component selection, power level, etc., is dependent upon the communication network 519 in which the mobile device 500 is intended to operate. For example, a mobile device 500 intended to operate in a North American market may include a communication subsystem 511 designed to operate with the Mobitex or DataTAC mobile data communication networks and also designed to operate with any of a variety of voice communication networks, such as AMPS, TDMA, CDMA, PCS, etc., whereas a mobile device 500 intended for use in Europe may be configured to operate with the GPRS data communication network and the GSM voice communication network. Other types of data and voice networks, both separate and integrated, may also be utilized with the mobile device 500.

Communication network access requirements for the mobile device 500 also vary depending upon the type of network 519. For example, in the Mobitex and DataTAC data networks, mobile devices are registered on the network using a unique identification number associated with each device. In GPRS data networks, however, network access is associated with a subscriber or user of the mobile device 500. A GPRS device typically requires a subscriber identity module ("SIM"), which is required in order to operate the mobile device 500 on a GPRS network. Local or non-network communication functions (if any) may be operable, without the SIM, but the mobile device 500 is unable to carry out functions involving communications over the network 519, other than any legally required operations, such as '911' emergency calling.

After any required network registration or activation procedures have been completed, the mobile device 500 is able to send and receive communication signals, preferably including both voice and data signals, over the network 519. Signals received by the antenna 516 from the communication network 519 are routed to the receiver 512, which provides for signal amplification, frequency down conversion, filtering, channel selection, etc., and may also provide analog to digital conversion. Analog to digital conversion of the received signal allows more complex communication functions, such as digital demodulation and decoding, to be performed using the DSP 520. In a similar manner, signals to be transmitted to the network 519 are processed, including modulation and encoding, for example, by the DSP 520 and are then provided to the transmitter 514 for digital to analog conversion, frequency up conversion, filtering, amplification and transmission to the communication network 519 via the antenna 518. Although a single transceiver 511 is shown for both voice and data communications, in alternative embodiments, the mobile device 500 may include multiple distinct transceivers, such as a first transceiver for transmitting and receiving voice signals, and a second transceiver for transmitting and receiving data signals, or a first transceiver configured to operate within a first frequency band, and a second transceiver configured to operate within a second frequency band.

In addition to processing the communication signals, the DSP 520 also provides for receiver and transmitter control. For example, the gain levels applied to communication signals in the receiver 512 and transmitter 514 may be adaptively controlled through automatic gain control algorithms implemented in the DSP 520. Other transceiver control algorithms could also be implemented in the DSP 520 in order to provide more sophisticated control of the transceiver 511.

The microprocessor 538 preferably manages and controls the overall operation of the mobile device 500. Many types of microprocessors or microcontrollers could be used here, or, alternatively, a single DSP 520 could be used to carry out the functions of the microprocessor 538. Low-level communication functions, including at least data and voice communications, are performed through the DSP 520 in the transceiver 511. High-level communication applications, including the voice communication application 524A, and the data communication application 524B are stored in the non-volatile memory 524 for execution by the microprocessor 538. For example, the voice communication module 524A may provide a high-level user interface operable to transmit and receive voice calls between the mobile device 500 and a plurality of other voice devices via the network 519. Similarly, the data communication module 524B may provide a high-level user interface operable for sending and receiving data, such as e-mail messages, files, organizer information, short text messages, etc., between the mobile device 500 and a plurality of other data devices via the network 519.

The microprocessor 538 also interacts with other device subsystems, such as the display 522, RAM 526, auxiliary I/O devices 528, serial port 530, keyboard 532, speaker 534, microphone 536, a short-range communications subsystem 540 and any other device subsystems generally designated as 542. For example, the modules 524A-N are executed by the microprocessor 538 and may provide a high-level interface between a user of the mobile device and the mobile device. This interface typically includes a graphical component provided through the display 522, and an input/output component provided through the auxiliary I/O devices 528, keyboard 532, speaker 534, or microphone 536. Such interfaces are designated generally as UI 46 in FIG. 3.

Some of the subsystems shown in FIG. 5 perform communication-related functions, whereas other subsystems may provide "resident" or on-device functions. Notably, some subsystems, such as keyboard 532 and display 522 may be used for both communication-related functions, such as entering a text message for transmission over a data communication network, and device-resident functions such as a calculator or task list or other PDA type functions.

Operating system software used by the microprocessor 538 is preferably stored in a persistent store such as the non-volatile memory 524. In addition to the operating system and communication modules 524A-N, the non-volatile memory 524 may include a file system for storing data. The non-volatile memory 524 may also include data stores for connection control information, and possibly authorization records. The operating system, specific device applications or modules, or parts thereof, may be temporarily loaded into a volatile store, such as RAM 526 for faster operation. Moreover, received communication signals may also be temporarily stored to RAM 526, before permanently writing them to a file system located in the non-volatile memory 524. The non-volatile memory 524 may be implemented, for example, with Flash memory, non-volatile RAM, or battery backed-up RAM.

An exemplary application module 524N that may be loaded onto the mobile device 500 is a PIM application providing PDA functionality, such as calendar events, appointments, and task items. This module 524N may also interact with the voice communication module 524A for managing phone calls, voice mails, etc., and may also interact with the data communication module 524B for managing e-mail communications and other data transmissions. Alternatively, all of the functionality of the voice communication module 524A and the data communication module 524B may be integrated into the PIM module.

The non-volatile memory 524 preferably provides a file system to facilitate storage of PIM data items on the device. The PIM application preferably includes the ability to send and receive data items, either by itself, or in conjunction with the voice and data communication modules 524A, 524B, via the wireless network 519. The PIM data items are preferably seamlessly integrated, synchronized and updated, via the wireless network 519, with a corresponding set of data items stored or associated with a host computer system, thereby creating a mirrored system for data items associated with a particular user.

The mobile device 500 is manually synchronized with a host system by placing the mobile device 500 in an interface cradle, which couples the serial port 530 of the mobile device 500 to a serial port of the host system. The serial port 530 may also be used to insert authorization records onto the mobile device 500 and to download other application modules 524N for installation on the mobile device 500. This wired download path may further be used to load an encryption key onto the mobile device 500 for use in secure communications, which is a more secure method than exchanging encryption information via the wireless network 519.

Authorization records and additional application modules 524N may be loaded onto the mobile device 500 through the network 519, through an auxiliary I/O subsystem 528, through the short-range communications subsystem 540, or through any other suitable subsystem 542, and installed by a user in the non-volatile memory 524 or RAM 526. Such flexibility in application installation increases the functionality of the mobile device 500 and may provide enhanced on-device functions, communication-related functions, or both. For example, secure communication applications may enable electronic commerce functions and other such financial transactions to be performed using the mobile device 500.

When the mobile device 500 is operating in a data communication mode, a received signal, such as a text message or a web page download, will be processed by the transceiver 511 and provided to the microprocessor 538, which preferably further processes the received signal for output to the display 522, or, alternatively, to an auxiliary I/O device 528. A user of the mobile device 500 may also compose data items, such as email messages, using the keyboard 532, which is preferably a complete alphanumeric keyboard laid out in the QWERTY style, although other styles of complete alphanumeric keyboards such as the known DVORAK style may also be used. User input to the mobile device 500 is further enhanced with the plurality of auxiliary I/O devices 528, which may include a thumbwheel input device, a touchpad, a variety of switches, a rocker input switch, etc. The composed data items input by the user are then transmitted over the communication network 519 via the transceiver 511, provided a connection is allowed.

When the mobile device 500 is operating in a voice communication mode, the overall operation of the mobile device 500 is substantially similar to the data mode, except that received signals are output to the speaker 534 and voice signals for transmission are generated by a microphone 536. In addition, the secure messaging techniques described above might not necessarily be applied to voice communications. Alternative voice or audio I/O devices, such as a voice message recording subsystem, may also be implemented on the mobile device 500. Although voice or audio signal output is accomplished through the speaker 534, the display 522 may also be used to provide an indication of the identity of a calling party, the duration of a voice call, or other voice call related information. For example, the microprocessor 538, in conjunction with the voice communication module 524A and the operating system software, may detect the caller identification information of an incoming voice call and display it on the display 522.

A short-range communications subsystem 540 is also be included in the mobile device 500. For example, the subsystem 540 may include an infrared device and associated circuits and components, or a Bluetooth or 802.11 short-range wireless communication module to provide for communication with similarly-enabled systems and devices. Thus, authorization record insertion and application loading operations as described above may be enabled on the mobile device 500 via the serial port 530 or other short-range communications subsystem 540.

It will be appreciated that the above description relates to preferred embodiments by way of example only. Many variations on the systems and methods described above will be obvious to those knowledgeable in the field, and such obvious variations are within the scope of the application as described and claimed, whether or not expressly described.

For example, although each entry in the connection policy store 36 in FIG. 2 associates a particular software application with a corresponding communication pipe, connection control information may have other formats. Connection control information may instead associate groups of software applications with a pipe. Software applications provided by the same source could be associated with the same pipe or pipes, for instance. Similarly, connection control information may associate one or more software applications with a group of pipes, such as all internal connections, all external connections, or all WAP connections, for example. Other types of connection groupings could be defined by a mobile device owner, or possibly a user where the user is trusted by the owner. Connection control information for groups of connections may include an identifier for each permitted connection in the group, or a connection group identifier which identifies the connections in the group.

It is also contemplated that certain trusted software applications could be permitted to open both internal and external connections on a mobile device. A software application provided by an owner of the mobile device, for example, is generally trusted by the owner and might be allowed both internal and external connections. This may be accomplished in a connection policy store with an entry of the form shown in FIG. 2 for application C, for example, or an authorization record store where authorization records are used. All software applications provided by a mobile device owner or sources trusted by the owner, or only software applications identified in a trusted application list stored on the mobile device, could be permitted to open both types of connections.

Connection control information and authorization records need not necessarily be permissive. Software applications may also or instead be associated with connections that the software application is not permitted to use. Any attempts by a software application to open a prohibited connection identified in connection control information or an authorization record are then denied.

Where a mobile device user is trusted by the mobile device owner, the user may be prompted to choose whether a requested connection should be allowed for a software application. When a connection is denied, a message could be displayed to the user, indicating the type of connection requested and the software application requesting the connection. The user then has final authority over connection denial.

FIG. 5 represents a specific example of a mobile device in which connection control systems and methods described above may be implemented. Implementation of such systems and methods in other mobile devices having further, fewer, or different components than those shown in FIG. 5 would be obvious to one skilled in the art to which this application pertains. For example, although a SIM card has not been explicitly shown in FIG. 5, it should be appreciated that implementation of connection control systems and methods in electronic devices with SIM cards is contemplated. Since SIM cards currently incorporate a memory component, connection control information, authorization records, or both, may be inserted onto a SIM card when or before the SIM card is provided to a user.

The above description focuses on a detailed description of a mobile communication device as the environment for connection control. However, the principles and implementations discussed herein can be readily used in any remote communicating device. For instance, the remote communicating device implementing connection control could be any wired or wireless device including, without limitation, a PDA, a mobile phone, a notebook computer, a desktop computer, a hand-held computer, a mobile e-mail device or a pager.

What is claimed is:

1. A method for use by a mobile device in controlling connections attempted by the mobile device, the mobile device including a user interface and a connection controller configured to control the connections attempted by the mobile device, the method comprising:

identifying, by the connection controller of the mobile device, a connection request from a software application executable on the mobile device, the connection request being for an attempt to open a communication connection for the software application between the mobile device and a remote device;

causing, by the connection controller, a prompt to be displayed in the user interface of the mobile device, the prompt being for user input for selecting whether the connection request from the software application is to be allowed;

in response to receiving user input indicating that the connection request from the software application is to be allowed, authorizing by the connection controller the attempt to open the communication connection, opening the communication connection, and allowing the mobile device to obtain data from the remote device over the opened communication connection; and in response to receiving user input indicating that the connection request from the software application is not to be allowed, denying by the connection controller the connection request for the attempt to open the communication connection.

2. The method of claim 1, wherein authorizing the opening of the communication connection comprises opening the communication connection for use by the software application.

3. The method of claim 1, wherein authorizing the opening of the communication connection comprises providing the software application with authorization information for use by the software application in opening the communication connection.

4. The method of claim 1, wherein
connection control information associated with the software application and stored on the mobile device comprises a record of the communication connection as an allowable communication connection, and wherein the prompting is responsive to determining that the connection request satisfies the connection control information associated with the software application.

5. The method of claim 1, further comprising creating or updating an entry of the connection control information in response to the user input.

6. The method of claim 1, further comprising obtaining data from the remote device via the communication connection for use by the software application.

7. The method of claim 1, wherein data obtained from the remote device comprises business-related data.

8. The method of claim 1, wherein data obtained from the remote device comprises personal data.

9. The method of claim 1, wherein the first connection request is a request for use of a physical transport layer.

10. The method of claim 9, wherein the physical transport layer is a wireless interface, a USB interface, an Infrared Data Association interface, a serial interface, a parallel interface, a PCMCIA interface, a PCI interface, or combinations thereof.

11. The method of claim 1, wherein
connection control information associated with the software application and stored on the mobile device comprises a record of the communication connection as a prohibited communication connection, and wherein the prompting is responsive to determining that the connection request does not satisfy the connection control information associated with the software application.

12. The method of claim 11, further comprising receiving the connection control information associated with the software application, and storing the connection control information on the mobile device.

13. The method of claim 12, further comprising authenticating the connection control information.

14. The method of claim 12, further comprising receiving a connection control information update associated with the software application and updating the connection control information based upon the received connection control information update.

15. The method of claim 12, wherein the connection control information is based upon a connection type associated with the software application, one or more allowable connection types associated with the software application, a source associated with the software application with which the one or more allowable connection types is associated, one or more prohibited connection types associated with the software application, a source associated with the software application with which the one or more prohibited connection types is associated, a manual association of connection control information associated with the software application, or combinations thereof.

16. The method of claim 12, further comprising creating or updating an entry of the connection control information associated with the software application based upon the user input, to indicate that the software application is restricted to opening connections to the remote device.

17. The method of claim 12, further comprising creating or updating an entry of the connection control information associated with the software application if the user input indicates authorization for both current and future openings of the first communication connection, to indicate that the software application is restricted to opening connections to the remote device.

18. The method of claim 12, further comprising:
receiving, after the opening of the communication connection, a second connection request from the software application for the opening of the communication connection between the mobile device and a different device other than the remote device;

determining if the second connection request satisfies the connection control information associated with the software application; and after determining that the second connection request does not satisfy the connection control information, denying authorization for opening the communication connection between the mobile device and the different device in response to the second connection request.

19. One or more non-transitory device-readable media for storing instructions that, upon execution by a processor, to control connections attempted by a mobile device by:
identifying, by a connection controller of the mobile device, a connection request from a software application executable on the mobile device, the connection request being for an attempt to open a communication connection for the software application between the mobile device and a remote device;

causing, by the connection controller, a prompt to be displayed in a user interface of mobile device, the prompt being for user input for selecting whether the connection request from the software application is to be allowed;

in response to receiving user input indicating that the connection request from the software application is to be allowed, authorizing by the connection controller the of attempt to open the communication connection, opening the communication connection, and allowing the mobile device to obtain data from the remote device over the opened communication connection; and in response to receiving user input indicating that the connection request from the software application is not to be allowed, denying by the connection controller the connection request for the attempt to open the communication connection.

20. A mobile device comprising:
a processor;
a connection controller configured to control connections attempted by the mobile device;
a user interface coupled to the processor;
memory coupled to the processor and being configured to store a software application;
the processor and the connection controller being configured to:
  identify, by the connection controller, a connection request from the software application executable on the processor, the connection request being for an attempt to open a communication connection for the software application between the mobile device and a remote device;
  cause, by the connection controller, a prompt to be displayed in the user interface of the mobile device, the prompt being for user input for selecting whether the connection request from the software application is to be allowed;
  in response to receiving user input indicating that the connection request from the software application is to be allowed, authorize by the connection controller the attempt to open the communication connection, open the communication connection, and allow the mobile device to obtain data from the remote device over the opened communication connection; and
  in response to receiving user input indicating that the connection request from the software application is not to be allowed, deny by the connection controller the connection request for the attempt to open the communication connection.

21. The device of claim 20, wherein the device is a PDA, a mobile phone, a notebook computer, a desktop computer, a hand-held computer, a mobile e-mail device or a pager.

* * * * *